(12) United States Patent
Oriol et al.

(10) Patent No.: US 8,389,171 B2
(45) Date of Patent: Mar. 5, 2013

(54) PREVENTING CORROSION IN A FUEL CELL

(75) Inventors: Jean Oriol, Le-Plessis-Trevise (FR);
Eric Fernandez, Saint Paul de Varces
(FR); Sébastien Rosini, Grenoble (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 0 days.

(21) Appl. No.: 13/502,406

(22) PCT Filed: Oct. 18, 2010

(86) PCT No.: PCT/EP2010/065655
§ 371 (c)(1),
(2), (4) Date: Apr. 17, 2012

(87) PCT Pub. No.: WO2011/048057
PCT Pub. Date: Apr. 28, 2011

(65) Prior Publication Data
US 2012/0237800 A1      Sep. 20, 2012

(30) Foreign Application Priority Data
Oct. 19, 2009 (FR) ...................................... 09 04997

(51) Int. Cl.
*H01M 8/04* (2006.01)
(52) U.S. Cl. ........................................ 429/429; 429/432
(58) Field of Classification Search .................. 429/428, 429/429, 430, 432
See application file for complete search history.

(56) References Cited

U.S. PATENT DOCUMENTS

| 5,013,617 | A | 5/1991 | Scheffler |
| 2002/0098393 | A1 | 7/2002 | Dine et al. |
| 2007/0224482 | A1 | 9/2007 | Shimoi et al. |
| 2008/0032163 | A1 | 2/2008 | Usborne et al. |
| 2008/0044694 | A1 | 2/2008 | Lee et al. |

FOREIGN PATENT DOCUMENTS

| AT | 505914 | 4/2001 |
| EP | 1450429 | 8/2004 |
| KR | 2010-0071712 | 6/2010 |
| WO | WO2005/099016 | 10/2005 |
| WO | WO 2005/107360 | 11/2005 |

OTHER PUBLICATIONS

International Search Report, PCT Application No. PCT/EP2010/065655, mailed Apr. 6, 2011 (3 pages).

*Primary Examiner* — Carlos Barcena
(74) *Attorney, Agent, or Firm* — Occhiuti Rohlicek & Tsao LLP

(57) ABSTRACT

The invention relates to a method for protecting a set of electrochemical cells incorporated into a fuel cell stack from corrosion during an operation for shutting down the fuel cell stack, which method comprises steps of:
  measuring the voltage across the terminals of each of the cells to be protected;
  when the voltage measured for a cell is above a protection threshold, discharging this cell into an electrical load;
  when the voltage measured for a cell is below said protection threshold, disconnecting this cell from the electrical load.

10 Claims, 2 Drawing Sheets

PREVENTING CORROSION IN A FUEL CELL

CROSS-REFERENCE TO RELATED APPLICATIONS

This application is the National Stage of International Application No. PCT/EP2010/065655, filed on Oct. 18, 2010, which claims the benefit of the priority date of French Application No. 0904997, filed on Oct. 19, 2009. The content of these applications is hereby incorporated by reference in its entirety.

FIELD OF DISCLOSURE

The invention relates to fuel cell stacks, and in particular to the prevention of corrosion during operations of shutting down a fuel cell stack.

BACKGROUND

A fuel cell stack is an electrochemical device that converts chemical energy directly into electrical power. A fuel cell stack comprises a plurality of cells in series. Each cell generates a voltage of about 1 volt, and stacking them allows a higher supply voltage, for example about one hundred volts, to be generated. Among known fuel cell stacks, mention may especially be made of proton exchange membrane (PEM) fuel cell stacks. Each cell of a PEM fuel cell stack comprises a membrane that only allows protons to cross it, between an anode and a cathode, and that blocks the passage of gas. The fuel cell stack may comprise a plurality of flow plates, for example made of graphite, the plates being stacked one on top of another and each plate being associated with a plurality of cells in the stack. The plates may comprise channels and orifices for guiding the reactants and products through the stack. At the anode, hydrogen gas, used as a fuel, is ionized to produce protons that pass through the membrane. The electrons produced by this reaction flow through an electrical circuit external to the cell, forming a current. At the cathode, oxygen is reduced and reacts with the protons to form water.

It is known that there is a risk that the cells of fuel cell stacks will be corroded when they are shut down. This is because, if no electrical load is connected across the terminals of the fuel cell stack during this operation, the presence of residual air on the cathode and the presence of residual hydrogen on the anode may induce inappropriate electrical potentials. Such potentials may oxidize and corrode a carbon support and a platinum catalyst, degrading their performance. This degradation is called Ostwald ripening. This effect becomes more problematic if the fuel cell stack is used in applications that require it to be frequently stopped. Various solutions to this problem have been suggested.

According to a first method, an inert gas is injected into the cells so as to purge the region near the anode and cathode immediately after disconnection of the electrical load. Such inert-gas injection both reduces the degradation in cell performance and prevents, for safety reasons, an inflammable mixture of hydrogen and air, which could appear, from appearing. U.S. Pat. No. 5,013,617 describes such a method, and the connection of an electrical load across the terminals of the fuel cell stack during the gas injection in order to rapidly lower the cathode potential of the cells to a level between 0.3 and 0.7 V.

However, this method has its drawbacks. This method results in a bulky fuel cell stack, which is undesirable in some applications such as automotive applications or mass market electronics. In addition, this method is not suited to applications in which the fuel cell stack is frequently shut down and started up, due to the time required for the purge.

To prevent rapid voltage variation in each cell of a fuel cell stack, document US 2007/0224482 suggests transferring electric charge from each cell to a corresponding energy storage device. This controls the voltage of each cell and increases the lifetime of the fuel cell stack.

Document EP 1 450 429 describes a fuel cell stack comprising a plurality of cells separated by separators. The cells are connected to external resistors, each resistor allowing a current to flow from each fuel cell stack so that corrosion problems related to fuel remaining after the cell has been shut down are solved. A switch is placed in series with the external resistors.

Document AT 505 914 describes a method for shutting down a cell of a fuel cell stack. The fuel cell stack comprises a plurality of cells connected in series. In operation, at least two reactive gases are introduced into the cells, and when operation is stopped, the supply of one of the gases is stopped. The gas remaining in the cells is consumed. The consumption of the residual gas is achieved by connecting an electrical load across the terminals of the cells.

Patent application US 2008/0032163 describes a system for controlling the shutdown and startup operations of a fuel cell stack. The system measures the voltage across the terminals of a number of cells and then determines the cell with the highest voltage and the cell with the lowest voltage. During the shutdown or startup operation, depending on the measured voltages, the system connects an electrical load of higher or lower resistance across the terminals of the fuel cell stack stack. The system sets the impedance of the electrical load so as to keep the voltage across the terminals of the cells between a minimum threshold and a maximum threshold, in order to prevent them from being degraded.

Such a system does not provide an optimal protection of the cells from deterioration.

SUMMARY

The invention aims to solve one or more of these drawbacks. The invention thus relates to a method for protecting a set of electrochemical cells incorporated into a fuel cell stack from corrosion during an operation of shutting down the fuel cell stack, which method comprises steps of:
  measuring the voltage across the terminals of each of the cells to be protected;
  when the voltage measured for a cell is above a protection threshold, discharging this cell into an electrical load, so that:
    when the voltage measured for a cell is above an intermediate threshold above the protection threshold, this cell is discharged into an electrical load;
    when the voltage measured for a cell is below the intermediate threshold, this cell is disconnected from the electrical load; and
    when the voltages across the terminals of the cells are all below said intermediate threshold, the cells are discharged down to the protection threshold;
  when the voltage measured for a cell is below said protection threshold, disconnecting this cell from the electrical load.

According to one embodiment, the method is applied to proton exchange membrane electrochemical cells.

According to another embodiment, the cells are discharged into respective dedicated electrical loads.

According to another embodiment, the subcells in a set of cells to be protected are simultaneously discharged when their respective voltages are above said protection threshold.

According to another embodiment, said protection threshold lies between 0.2 and 0.6 V.

According to another embodiment, the method comprises iteratively setting decreasing intermediate thresholds, discharging a cell when its measured voltage is above the newly set intermediate threshold, or disconnecting a cell from the electrical load when its measured voltage is below the newly set intermediate threshold.

The invention also relates to a fuel cell stack, comprising:
a set of electrochemical cells to be protected from corrosion;
a device for measuring the voltage across the terminals of each of said cells;
a circuit for protecting the electrochemical cells, the circuit being able to detect an operation of shutting down the fuel cell stack, and being able, when a shutdown operation is detected, to:
  discharge, into an electrical load, each cell having a measured voltage above a protection threshold, so that:
    when the voltage measured for a cell is above an intermediate threshold above the protection threshold, this cell is discharged into an electrical load;
    when the voltage measured for a cell is below the intermediate threshold, this cell is disconnected from the electrical load; and
    when the voltages across the terminals of the cells are all below said intermediate threshold, the cells are discharged down to the protection threshold; and
  disconnect each cell having a measured voltage below said protection threshold from the electrical load.

According to one embodiment, the electrochemical cells are proton exchange membrane electrochemical cells.

According to another embodiment, the set of electrochemical cells forms a stack of cells connected in series.

According to another embodiment, the protection circuit comprises electrical loads and switches, one load and switch being dedicated to each of said cells, the protection circuit switching a dedicated switch on in order to discharge a cell into its dedicated load.

Other features and advantages of the invention will become clearly apparent from the nonlimiting description thereof given below by way of information and with reference to the appended drawings, in which:

DETAILED DESCRIPTION

In practice, during operations of shutting down a fuel cell stack, the voltage of each cell independently decreases. The decrease in the voltage of a cell depends on the operating conditions of the fuel cell stack: humidity, gas pressure gradients, the local temperature, the materials used and the electrochemical effects employed. The initial voltage levels of each of the cells of the fuel cell stack when the latter is stopped are also different, especially due to manufacturing tolerances. Therefore, even if discharging the entire stack into an electrical load allows the cells to be protected from overvoltage-related corrosion, some cells may drop to too low a voltage level during discharge. These cells may then deteriorate. If the discharge is stopped while some cells have a voltage level that is still too high, these cells may also deteriorate.

The invention protects a set of electrochemical cells of a fuel cell stack from corrosion during the operation of shutting down the fuel cell stack. The voltage across the terminals of each cell to be protected is measured. If the voltage of a cell is above a protection threshold, this cell is discharged into an electrical load. If the voltage measured for this cell is below this threshold, the cell is disconnected from the electrical load.

The invention allows the discharge of the cells to be optimized upon shutting down the fuel cell stack, preventing both corrosion due to voltage levels that are too high and degradation due to voltage levels that are too low. The cells to be protected also have a relatively uniform voltage level at the end of the shutdown operation.

Figure 1:
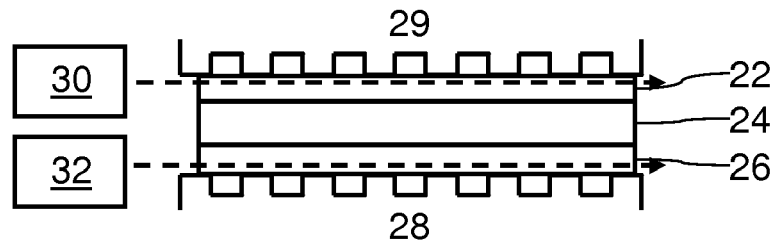
FIG. 1 shows a schematic of a fuel-cell cell.

FIG. 1 shows a schematic of a cell of a proton exchange membrane or polymer electrolyte membrane fuel cell stack (generally called a PEM fuel cell stack). The fuel cell stack comprises a fuel source 30 that supplies hydrogen gas to an inlet of the cell. The fuel cell stack also comprises an air source 32 that supplies air to an inlet of the cell, the air containing the oxygen used as an oxidant. The cell comprises an anode 22, a cathode 26, and an electrolyte layer 24, the electrolyte layer being placed between the anode and the cathode. The anode 22 usually comprises a gas diffusion layer, and a catalyst layer that is placed between this gas diffusion layer and the electrolyte 24. The gas diffusion layer diffuses the gas from a flow channel towards the catalyst layer. The gas diffusion layer may for example be, as is known per se, a felt or carbon cloth, to which a hydrophobic agent, such as polytetrafluoroethylene, is fixed. The catalyst layer of the anode 22 generally comprises platinum and polytetrafluoroethylene, both of which are fixed to a carbon support. The polytetrafluoroethylene is used for its hydrophobic properties, platinum being used for its catalyst properties. The cathode 26 usually comprises a gas diffusion layer, and a catalyst layer that is placed between this gas diffusion layer and the electrolyte 24. The electrolyte layer 24 is a semipermeable membrane that conducts protons while being impermeable to the gases present in the cell. The cell moreover comprises a plate 29 for guiding anode gas flows and a plate 28 for guiding cathode gas flows, the plates being placed facing the anode 22 and the cathode 26, respectively. The plates 28 and 29 are for example made of graphite, in a way known per se.

During operation of the fuel cell stack, air flows between the electrolyte 24 and the plate 28, and hydrogen gas flows between the electrolyte 24 and the plate 29. At the anode 22, hydrogen gas is ionized so as to produce protons that pass through the electrolyte 24. The electrons produced by this reaction are applied to an electrical load connected to the fuel cell stack, so as to form a current. At the cathode, oxygen is reduced and reacts with the protons to form water. The reactions at the anode and cathode are the following:

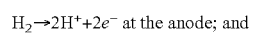

$H_2 \rightarrow 2H^+ + 2e^-$ at the anode; and

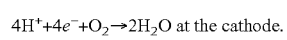

$4H^+ + 4e^- + O_2 \rightarrow 2H_2O$ at the cathode.

During its operation, a cell usually generates a DC voltage, between the anode and the cathode, of about 1 V.

Figure 2:
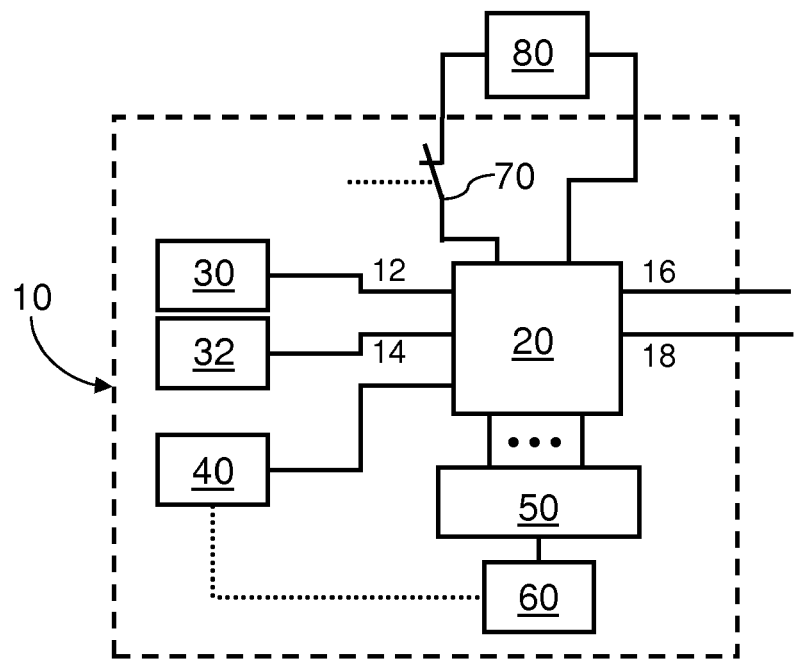
FIG. 2 shows a schematic of an electronic circuit for protecting the fuel cell stack.

FIG. 2 shows a schematic of a fuel cell stack 10 intended to supply power to an electrical load 80. The fuel cell stack 10 comprises a stack of cells such as that described in FIG. 1. These cells are electrically connected in series, so that the stack applies an appropriate voltage across the terminals of the load 80.

The fuel source 30 selectively delivers hydrogen gas to an inlet 12 of the stack 20. The air source 32 selectively delivers air to an inlet 14 of the stack 20. The stack 20 has an outlet 16 for removing excess hydrogen gas and an outlet 18 for removing water and heat generated by the electrochemical reaction.

Although not illustrated, the fuel cell stack 10 may comprise a system for cooling the stack 20.

The fuel cell stack 10 comprises a control module 60, operated by way of a microcontroller, for example. The fuel cell stack 10 moreover comprises a module for protecting the stack from corrosion 50, a circuit for monitoring the voltage of the cells in the stack 40, and a switch 70 allowing the stack 20 to be selectively connected to the load 80. The control module 60 controls the operation of the switch 70 and the protection module 50. The control module 60 is also connected to the monitoring circuit 40 in order to receive voltage levels from the cells in the stack 20.

When the fuel cell stack 10 is started up, the fuel source 30 and the air source 32 then supply the stack 20. A nominal electrical voltage is then generated across the terminals of the stack 20. The control module 60 switches the switch 70 on so that the stack 20 supplies electrical power to the load 80.

Figure 3:
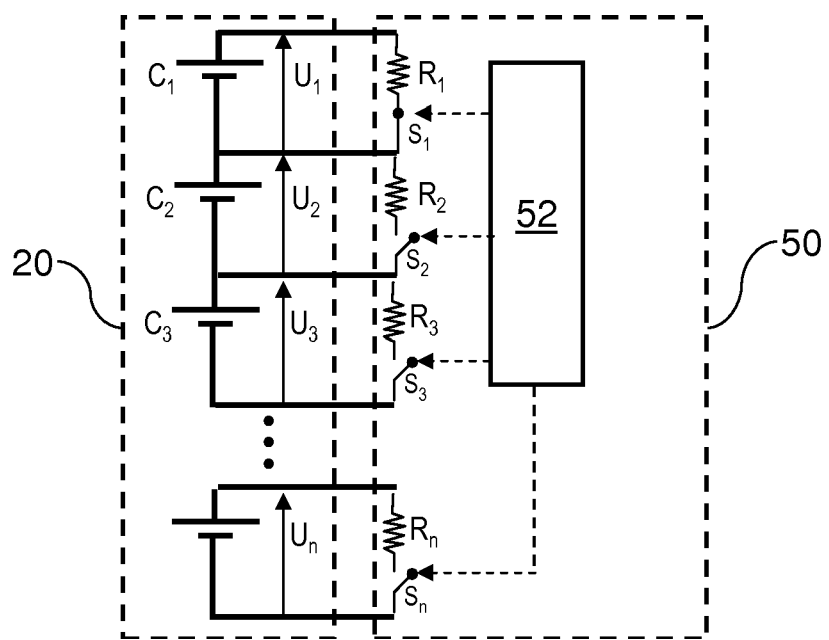
FIG. 3 shows a schematic of a fuel cell stack associated with an electrical load.

FIG. 3 shows a schematic of an exemplary protection module 50 connected to the stack 20. Advantageously, the module 50 comprises a resistor and a switch, both of which are dedicated to one respective cell of the stack 20. Each cell to be protected is thus connected to a dedicated resistor and switch of the module 50. Thus, a switch S1 and a resistor R1 are connected to the cell C1, a switch S2 and a resistor R2 are connected to the cell C2 and a switch S3 and a resistor R3 are connected to the cell C3. The protection module 50 moreover comprises a control circuit 52 that switches the switches on and off depending on control signals transmitted by the control module 60. The control circuit 52 switches all the switches on and off independently. The switches may be transistors integrated in a circuit of the protection module 50.

When the fuel cell stack 10 has already been started up and the cells have been supplied with air and fuel, the control circuit 52 keeps all the switches switched off so as to prevent the power produced by the cells in the stack 20 being dissipated in the resistors of the protection module 50.

During an operation of shutting down the fuel cell stack 10, the flow of fuel and air through the stack 20 is stopped and the switch 70 is switched off so as to disconnect the load 80. After disconnection from the load 80, hydrogen gas and air are still present in the cells in the stack 20. The electrochemical reaction in the cells continues for a short time. Since the load 80 has been disconnected from the cells, voltages that are too high may be generated at the anode and cathode, possibly inducing corrosion.

To protect the cells of the stack 20 from corrosion, the control circuit 52 switches the dedicated switches on so that the transient current generated is dissipated in the dedicated resistors of the module 50.

During an operation for shutting down the fuel cell stack 10, the control module 60 protects the cells in the stack 20 in the following way. The monitoring circuit 40 measures the voltage across the terminals of each of the cells to be protected (generally, all the cells in the stack 20). The monitoring circuit 40 typically comprises an analog-to-digital converter intended to deliver the voltage values of the various cells to the microcontroller of the control module 60. Each of these voltages is compared by the control module 60 with a predefined protection voltage threshold. This voltage threshold corresponds to a level below which a cell may be kept without there being a risk that the materials of the cell will corrode. Each cell having a voltage above the predefined protection threshold has its dedicated switch switched on so as to allow each cell to discharge into its dedicated resistor. The current thus generated due to the presence of residual hydrogen gas is dissipated by Joule heating of the dedicated resistors.

When the monitoring circuit 40 measures a cell voltage below the predefined threshold, the switch dedicated to this cell is switched off in order prevent excessive discharge of the cell since excessive discharge could lead to the cell deteriorating. The protection threshold lies, for example, between 0.2 V and 0.6 V.

Thus, the various cells of the stack 20 are discharged independently, thereby allowing the fuel cell stack 10 to be shut down without there being a risk that a set of cells, some of which have lower voltages or higher discharge rates, will deteriorate. The shutdown operation is thus carried out so that the cells all have a relatively uniform optimal final voltage.

Moreover, such a method consumes the hydrogen remaining in the anode regions of the cells. In contrast, a method that purges the stack with an inert gas during the shutdown operation does not allow all the residual hydrogen to be purged, for example hydrogen contained in the diffusion plate 29.

Figure 4:
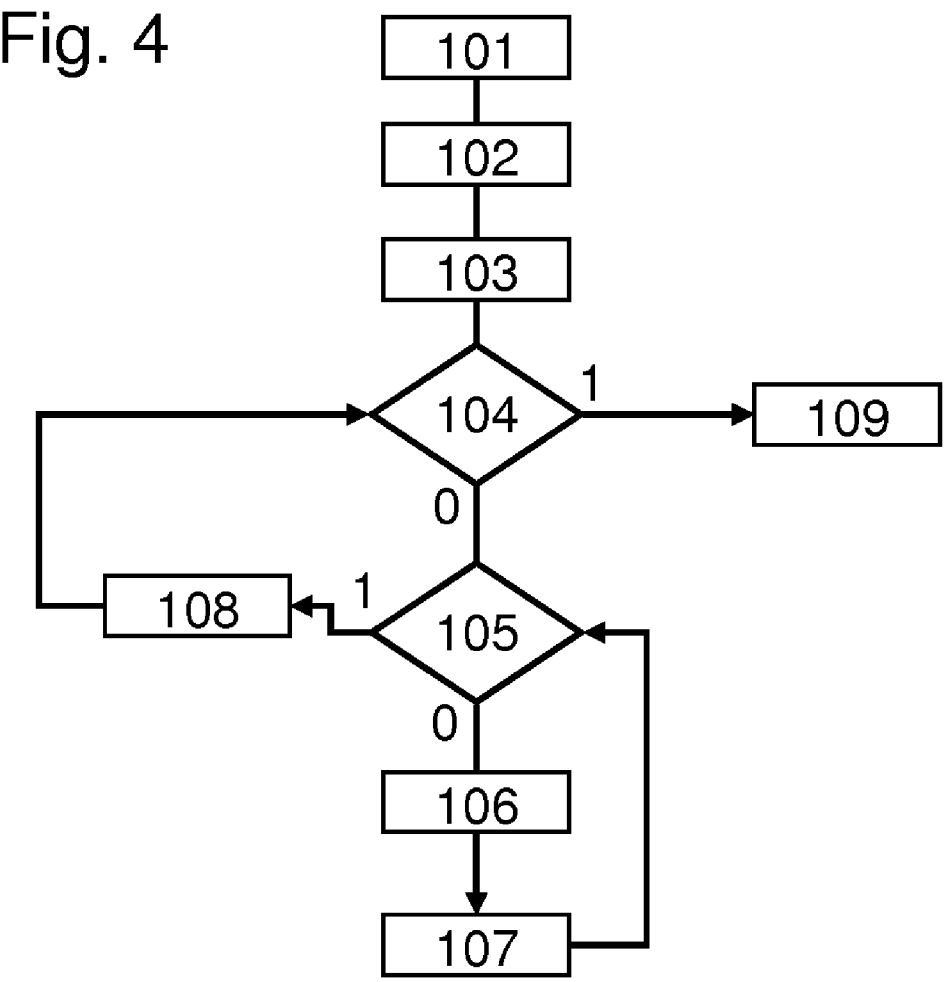
FIG. 4 is a flow charge of an example of how the electronic circuit functions during an operation of shutting down the fuel cell stack.

FIG. 4 shows a flow chart of a first exemplary implementation of a method for discharging cells according to the invention. In this method, the discharge of the cells is carried out in stages.

In a step 101, the start of an operation for shutting down the fuel cell stack 10 is detected. In a step 102, the voltage across the terminals of each of the cells is measured. In a step 103, an intermediate voltage threshold is set.

This threshold will for example be set, at the start of the flow chart, to a value equal to 90% of the voltage measured for the cell having the highest voltage, or to a value stored in memory beforehand. In a step 104, it is determined whether the set intermediate threshold is below the protection threshold. The protection threshold will, for example, possibly be a predefined value lying between 0.2 and 0.6 V. If the set intermediate threshold is below the protection threshold, it means that the various cells of the stack are sufficiently discharged to ensure they are protected, the flow charge then passing to step 109, stopping the discharge process.

If the set intermediate threshold is above the protection threshold, it is determined, in step 105, whether all the cell voltages are below the intermediate threshold. If such is the case, the cells have indeed been discharged down to the intermediate threshold. The intermediate threshold is then incrementally decreased in step 108, before returning to step 104. If at least one cell has a voltage above the intermediate threshold, step 106 is passed to. In step 106 the dedicated switch of the cells having a voltage above the intermediate threshold is switched on. These cells are thus discharged. The dedicated switch of the cells having a voltage below the intermediate threshold is switched off, preventing these cells from discharging. In step 107, the voltage of all the cells is measured before step 105 is returned to.

This iterative method allows all of the cells to be progressively discharged down to the protection threshold. This method employs dedicated loads of constant impedance, the discharge of the various cells thereby occurring by means of discharges of different durations.

This process allows the voltage of the cells to be decreased step by step down to the protection threshold. Such a discharge method allows the discharge time of the various cells to be different depending on their initial charge. Thus, a high current is never demanded, running the risk of a cell deteriorating, when this cell is only holding a small charge According to another exemplary implementation of a discharge method according to the invention, the cells may also be discharged directly and continuously until the protection threshold is passed. Such a discharge allows the time during which a high voltage is applied across the terminals of the cells to be reduced. The lifetime of the fuel cell stack is thus optimized.

The invention claimed is:

1. A method for protecting a set of electrochemical cells incorporated into a fuel cell stack from corrosion during an operation for shutting down the fuel cell stack, said method comprising measuring a voltage across terminals of each of the cells to be protected;

when the voltage measured for a cell is above a protection threshold, discharging the cell into an electrical load, so that:

when the voltage measured for a cell is above an intermediate threshold above the protection threshold, the cell is discharged into an electrical load;

when the voltage measured for a cell is below the intermediate threshold, the cell is disconnected from the electrical load; and when the voltages across the terminals of the cells are all below said intermediate threshold, discharging the cells down to the protection threshold;

when the voltage measured for a cell is below said protection threshold, disconnecting the cell from the electrical load.

2. The method of claim 1, wherein the cells are proton exchange membrane electrochemical cells.

3. The method of claim 1, wherein the cells are discharged into respective dedicated electrical loads.

4. The method of claim 1, wherein the cells in a set of cells to be protected are simultaneously discharged when their respective voltages are above said protection threshold.

5. The method of claim 1, wherein said protection threshold lies between 0.2 and 0.6 V.

6. The method of claim 1, further comprising iteratively setting decreasing intermediate thresholds, discharging a cell when a measured voltage thereof is above the newly set intermediate threshold, disconnecting a cell from the electrical load when a measured voltage thereof is below the newly set intermediate threshold.

7. A fuel cell stack comprising a set of electrochemical cells to be protected from corrosion;

a device for measuring voltage across terminals of each of said cells;

a circuit for protecting the electrochemical cells, the circuit being programmed to detect an operation for shutting down the fuel cell stack, and being programmed to, when a shutdown operation is detected, discharge, into an electrical load, each cell having a measured voltage above a protection threshold, so that:

when the voltage measured for a cell is above an intermediate threshold above the protection threshold, the cell is discharged into an electrical load;

when the voltage measured for a cell is below the intermediate threshold, the cell is disconnected from the electrical load; and when the voltages across the terminals of the cells are all below said intermediate threshold, discharge the cells down to the protection threshold; and disconnect each cell having a measured voltage below said protection threshold from the electrical load.

8. The fuel cell stack of claim 7, wherein the electrochemical cells comprise proton exchange membrane electrochemical cells.

9. The fuel cell stack of claim 7, wherein the set of electrochemical cells forms a stack of cells connected in series.

10. The fuel cell stack of claim 7, wherein the circuit for protecting the electrochemical cells comprises electrical loads and switches, one load and switch being dedicated to each of said cells, the circuit being configured for switching a dedicated switch to discharge a cell into a dedicated load thereof.

* * * * *